United States Patent [19]
Kroll et al.

[11] Patent Number: 4,522,147
[45] Date of Patent: Jun. 11, 1985

[54] SME SHUTTER MECHANISM

[75] Inventors: John W. Kroll, Greendale; Roy Hyink, Wauwatosa, both of Wis.

[73] Assignee: Eaton Corporation, Cleveland, Ohio

[21] Appl. No.: 533,247

[22] Filed: Sep. 19, 1983

[51] Int. Cl.[3] .......... G01K 1/02
[52] U.S. Cl. .......... 116/216; 116/221; 374/205
[58] Field of Search .......... 148/402, 11.5 N; 116/216, 221; 374/205; 340/594; 337/140

[56] References Cited

U.S. PATENT DOCUMENTS

| | | | |
|---|---|---|---|
| 1,501,173 | 7/1924 | Moore | 116/216 |
| 1,695,827 | 12/1928 | Sipe | 116/221 |
| 3,483,752 | 12/1969 | Rogen et al. | 116/216 |
| 3,594,675 | 7/1971 | Wilson | 337/140 |
| 3,613,732 | 10/1971 | Wilson et al. | 337/140 |
| 4,141,247 | 2/1979 | Schlick | 374/205 |
| 4,169,381 | 10/1979 | Skopil | 374/205 |

*Primary Examiner*—Charles Frankfort
*Assistant Examiner*—Thomas B. Will
*Attorney, Agent, or Firm*—Andrus, Sceales, Starke & Sawall

[57] ABSTRACT

A shutter 4 is movably mounted in a housing 6 for actuation between given positions by an SME (shape memory effect) element 8 in response to a given level of current flow through the SME element 8 causing $I^2R$ heating of the latter above its transition temperature. The shutter 4 may be an indicator flag exposed by a window 10 in the housing 6, or may interrupt an optic beam 22.

3 Claims, 3 Drawing Figures

SME SHUTTER MECHANISM

BACKGROUND AND SUMMARY

The invention relates to shape memory effect (SME) alloys, and more particularly to an implementation thereof in combination with a shutter mechanism.

SME alloys are known in the art and exhibit a given mechanical movement in response to heating above a transition temperature. The movement is definite, predictable and repeatable. A one-way SME element can be externally biased to return to its original position upon cooling below the transition temperature. A two-way SME element returns without external bias.

DETAILED DESCRIPTION

Figure 1:
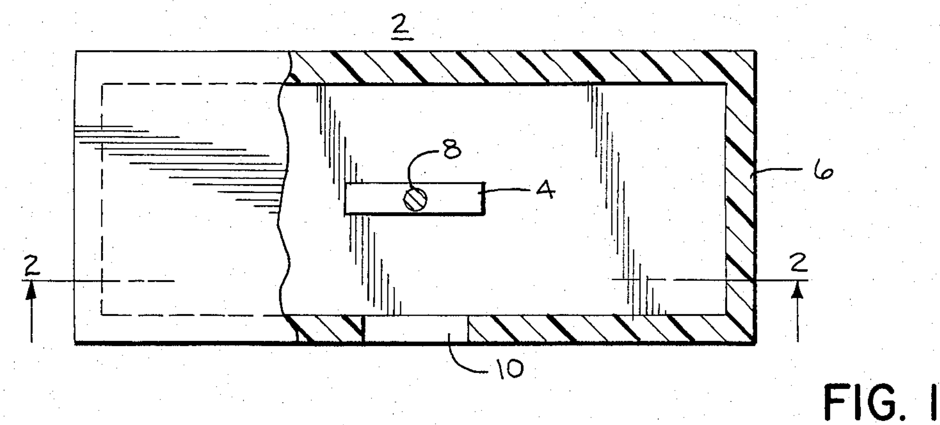
FIG. 1 is a top elevational view of an SME shutter mechanism constructed in accordance with the invention, with the cover partially cut-away.
Figure 2:
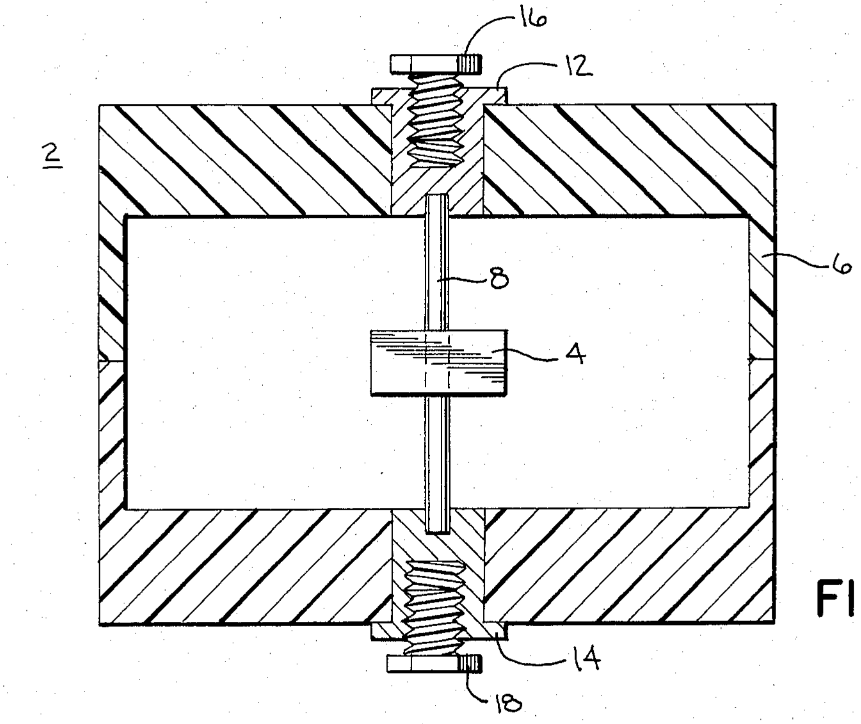
FIG. 2 is a cross-sectional view taken along line 2—2 of FIG. 1.

There is shown in FIGS. 1 and 2 a shape memory effect, SME, shutter mechanism 2. A shutter 4 is movably mounted in a housing 6 for actuation between given positions. SME means 8 is provided in housing 6 for actuating shutter 4 in response to a given level of current flow through SME means 8 causing $I^2R$ heating of the latter above its transition temperature. Shutter 4 is mounted and fixed to SME element 8 and moved thereby between the noted given positions. Housing 6 has a window 10, and in one embodiment shutter 4 is an indicator flag viewable through window 10 in at least one of the noted positions.

In the preferred embodiment, SME element 8 rotates or torisonally twists in response to $I^2R$ heating thereof above its transition temperature. In this embodiment, SME element 8 is a longitudinal shaft mounted in housing 6 at its opposite end to terminals 12 and 14 for completing an electrical circuit through SME element 8. The ends of shaft 8 are nonrotatably secured in respective terminals 12 and 14, which are in turn non-rotatably secured in housing 6 and receive respective threaded lugs or screws 16 and 18 for circuit connection. SME shaft element 8 torsionally twists about its longitudinal axis in response to a given level of current flow therethrough causing $I^2R$ heating thereof above its transition temperature. In this particular embodiment, shaft 8 responds by rotating 180° such that one of the faces of flag 4 appears in window 10.

SME element 8 is preferably two-way, and thus when the current flow through element 8 falls below the noted given level the temperature of element 8 falls below its transition temperature and shaft 8 return-rotates 180° to its original position such that the other face side of flag 4 appears in window 10. The opposing facing sides of flag 4 thus provide a state indication through window 10. Examples of state indicators for shutters of this type are go-no go, on-off, green-red, etc.

The disclosed combination takes advantage of the large deflection, torsional rotation, characteristic of SME element 8. An advantage of the particular combination is its low electrical power requirements, 100 milliwatts or less.

Figure 3:
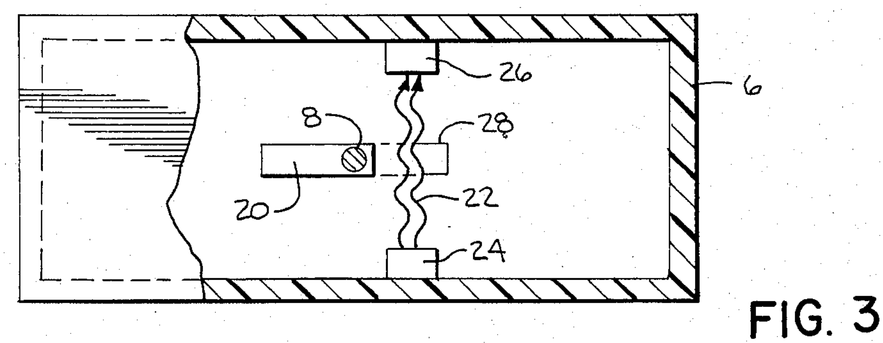
FIG. 3 is a view like FIG. 1 but showing an alternate embodiment.

FIG. 3 shows an alternative embodiment, and like reference numerals are used from FIGS. 1 and 2 where appropriate to facilitate clarity. Shutter 20 is mounted to SME shaft 8 near one edge of the shutter such that the latter will be turned into or out of an optic beam path 22 between sender 24 and receiver 26 for interrupting or allowing passage of the optic beam, to afford optical actuation as a state indication. The alternate position of shutter 20 is shown in dashed line at 28 which interrupts and blocks optic beam 22.

In preferred form, SME shaft 8 is a two-way element, though a one-way SME alloy plus a bias torsion spring (not shown) may be used if desired. Other alternatives include the use of translational rather than rotational motion. The combination takes advantage of the large motion characteristics and nonlinear response of the SME element, resulting in quick motion. This motion can be enhanced by the addition of detents if desired.

It is recognized that various modifications are possible within the scope of the appended claims.

We claim:

1. A shape memory effect, SME, shutter mechanism comprising:

a shutter movably mounted in a housing for actuation between given positions; and SME means in said housing for actuating said shutter in response to a given level of current flow through said SME means causing $I^2R$ heating of the latter above its transition temperature, said SME means comprising an SME element directly internally heated by current flow through said SME element itself.

2. The invention according to claim 1 wherein:

said SME element is operatively coupled to said shutter and moves from an original position to an actuated position in response to said direct internal $I^2R$ heating of said SME elements above said transition temperature; and said SME element is itself self-biased to return to said original position without auxiliary return springs or the like, in the absence of said $I^2R$ direct internal heating thereof.

3. A shape memory effect, SME, shutter mechanism comprising:

a shutter movably mounted in a housing for actuation between given positions;

SME means in said housing for actuating said shutter in response to a given level of current flow through said SME means causing $I^2R$ heating of the latter above its transition temperature;

terminal means in said housing for completing an electrical circuit through said SME means; wherein:

said shutter is mounted to said SME means and moved thereby between said given positions;

said SME means comprises a shaft mounted in said housing at its opposite ends;

said shutter is mounted on said shaft between said ends;

said terminal means engage said ends of said shaft;

said shaft rotates axially in response to $I^2R$ heating thereof above said transition temperature;

said ends of said shaft are nonrotatably secured in said terminal means and said shaft torsionally rotates.

* * * * *